United States Patent [19]

Radermacher

[11] 3,986,024

[45] Oct. 12, 1976

[54] ARRANGEMENT FOR ELECTRICAL DETECTION OF IONS FOR MASS-SPECTROSCOPIC DETERMINATION OF THE MASS-MAGNITUDES AND MASS-INTENSITIES OF IONS

[75] Inventor: Leonhard Radermacher, Julich-Selgersdorf, Germany

[73] Assignee: Kernforschungsanlage Julich Gesellschaft mit beschrankter Haftung, Julich, Germany

[22] Filed: Dec. 15, 1975

[21] Appl. No.: 640,950

[30] Foreign Application Priority Data

Dec. 23, 1974 Germany ........................... 2461224

[52] U.S. Cl. ................................ 250/299; 250/283; 250/397; 250/489

[51] Int. Cl.[2] ......................................... B01D 59/44

[58] Field of Search .......... 250/281, 283, 336, 397, 250/489, 207, 213 R, 213 VT, 299

[56] References Cited

UNITED STATES PATENTS

| | | | |
|---|---|---|---|
| 3,691,382 | 9/1972 | Somer | 250/336 |
| 3,946,227 | 3/1976 | Bingham | 250/281 |

*Primary Examiner*—Eugene La Roche
*Attorney, Agent, or Firm*—Max Fogiel

[57] ABSTRACT

An arrangement for the electrical detection of ions for mass spectroscopic determination of the mass values and of the mass intensities, in which a channel multiplier plate has a number of electron multipliers of minimum dimension, and is located behind the exit gap of the magnet of the mass spectroscopic device for capturing ions focused in the focal plane of the spectroscopic device. The electrons emanating from the channel multiplier plate and emitted off by ions of different mass in the electron multipliers, are captured and the signals generated by the collected electrons are transmitted to a recorder. Wires located behind and along the channel multiplier plate, capture the electrons and transmit the signals generated by the electrons, to the recorder. The wires are perpendicular to the direction of the electron multipliers, and perpendicular to the lengthwise direction of the exit gap. The wires are isolated from each other and do not contact one another. The wires have surfaces facing the channel multiplier plate to serve as collecting surfaces for the electrons. An amplifier is connected to each wire for amplifying the current pulses generated by the electrons in the wires.

7 Claims, 2 Drawing Figures

FIG. 1
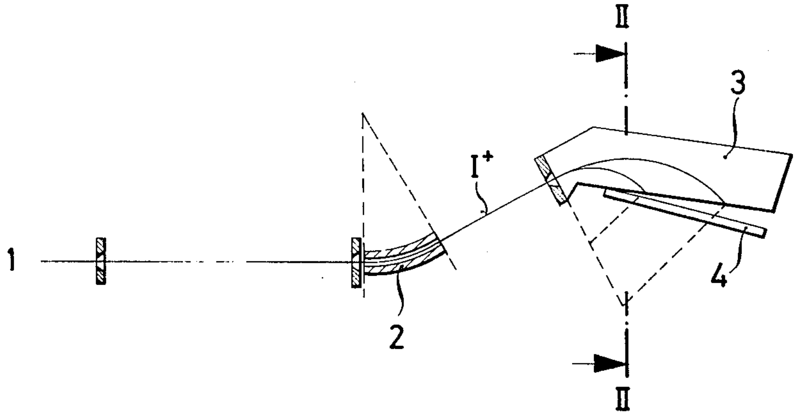
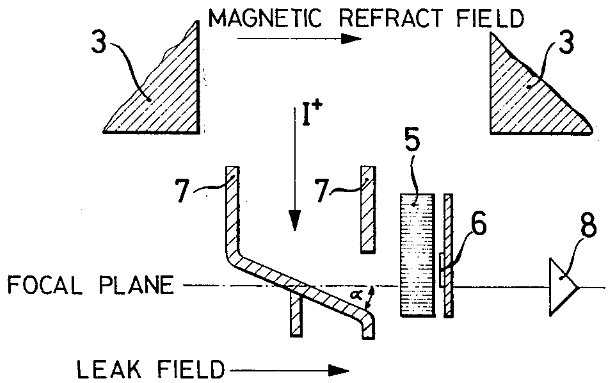
FIG. 2

ARRANGEMENT FOR ELECTRICAL DETECTION OF IONS FOR MASS-SPECTROSCOPIC DETERMINATION OF THE MASS-MAGNITUDES AND MASS-INTENSITIES OF IONS

BACKGROUND OF THE INVENTION

The present invention relates to a device for the electrical detection or identification of ions for the mass spectroscopic determination of the mass values and of the mass intensities of the ions. The device is provided with a channel multiplier plate having a number of electron multipliers of minimum dimension located behind the discharge or exit gap of the magnet of the mass spectroscopic device for capturing (collecting) ions focused in the focal plane of the mass spectroscopic device. The device has, further, means for capturing (collecting) the electrons emanating from the channel multiplier plate and emitted or knocked off by ions of different mass in the electron multipliers of the channel multiplier plate, and for transmitting the signals generated by the collected electrons to a recording device series-connected to the device.

Arrangements for the detection of ions in the spectroscopic determination of the mass values and/or of the mass intensity of the ions were used, for example, in spark mass spectrometry or in secondary mass spectrometry. Frequently an attempt is made to cover the mass spectrum as completely as possible.

It is already known in the art how to identify ion current signals incident during a mass spectroscopic measurement (test) by means of a photo plate located in the focal plane of the mass spectroscopy device. All ion current signals are recorded simultaneously which is advantageous especially when ion currents which greatly fluctuate timewise are involved. However, this advantage is diminished by the fact that the emulsion of the photo plate has only a relatively small threshold. Therefore, in case all measurable mass values of the spectrum are to be evaluated, several exposures of the same photo plate with different exposure times are required. For evaluation of certain mass lines, one can use only those exposures where the mass lines are in the evaluatable range of the nonlinear sensitometric curve of the photo plate. Hence the evaluation of the spectrum is cumbersome and time-consuming. Another disadvantage is that the measuring accuracy of the photo plate is impaired by the variation of the sensitivity of the photo plate from plate to plate, and frequently within one and the same plate and by the even greater variation from emulsion to emulsion. Furthermore, the absolute sensitivity of the photo plate depends on many factors such as ion mass, ion energy, ion type, charge condition of the ion and the form of the ion. Therefore, photo plates are generally used only for measuring relative ion frequencies of occurrence.

It is also known in the art how to record mass spectra by means of devices where the ion current signals are measured electrically. If only one collection point for an ion current signal is provided at the discharge gap of the mass spectroscopic device, the mass spectra are recorded by slowly varying the magnetic separating field or the accelerating potential in the mass spectroscopic device. Consequently, the ion current signals reach the collection point successively in time. In contrast to the identification of the ion current signals by means of a photo plate, with the electrical identification of the ion current signals, the mass size is directly proportional to the intensity of the ion current signal and hence can be measured with great accuracy for all mass values of the spectrum. The disadvantage is that with this known device for the electrical detection of the ion current signals, the ion current signals arrive one after the other at the collection point. As a result, the measuring accuracy of this known device is limited due to the statistical fluctuations of the signals. As a consequence, with ion currents of less than approximately $10^{-14}$ amperes, only relatively inaccurate results can be achieved. To be sure, in such cases the measurements are repeated several times and the measured values are integrated; however, the relative accuracy then depends heavily on the measuring time.

There are also known devices with at least two collection points for the ion current signals which are used when the ratio of frequencies of the isotopes is to be measured. The spacing between the collection points corresponds to the mass ratio of the isotopes to be measured. This results in increased measurement accuracy; but this known device records only the ion current signals of the isotopes to be measured, and not the entire mass spectrum.

There also is known a device for the electrical detection or identification of ions where behind the discharge or exit gap of the mass spectroscopic device, there is located a channel multiplier plate known as "Spiraltron array" (cf. "International Journal of Mass Spectrometry and Ion Physics", 11, pp. 409 – 415, 1973). Behind the channel multiplier plate whose length is approximately 3 cm, an anode with a resistance plate of constant thickness is located at a distance of 0.25 cm. The impact points for the electrons exiting behind the channel multiplier plate and impacting the anode are obtained from the ratio of the parts of the resistance plate located on both sides of the impact point towards the two ends of the anode. The disadvantage is that the determination of the impact points is restricted by the fluctuations in the linearity of the resistance coating and by the exit divergence of the electron beams up to the anode. The local resolution, which is stated to be several tenths of a millimeter, is relatively small. Another disadvantage is that the impact points of simultaneously arriving electron beams cannot be determined.

It is, therefore, an object of the present invention to provide an arrangement for the detection or identification of ions in the mass spectroscopic determination of the mass values and/or the mass intensities of the ions which makes it possible to record the spectrum of the ion current signals with a great local resolution, and at the same time to identify all measured ion current signals with great accuracy.

Another object of the present invention is to provide an arrangement of the foregoing character which is simple in design and construction, and which may be economically fabricated.

A still further object of the present invention is to provide an arrangement, as described, which has a substantially long operating life.

SUMMARY OF THE INVENTION

The objects of the present invention are achieved by providing that the device for collecting the electrons and for transmission of the signals generated by the electrons, has wires located behind and along the channel multiplier plate and perpendicular to the direction of the electron multipliers and perpendicular to the lengthwise direction of the discharge gap of the magnet, without contacting one another and insulated from one another. The wire surfaces facing the channel multiplier plate are designed as collecting surfaces for the electrons; an amplifier is series-connected to each wire to amplify the current pulses set off in the wires by the electrons.

As channel multiplier plate, one uses a channel multiplier plate known by the designation "channel plate." Such plates have up to several $10^5$ electron multiplier channels per square centimeter. The channel diameter is approximately 15 $\mu$m. If the diameter of the wires and the spacing between the wires approximates the diameter of the channels, a very high local resolution for the ions impacting the channel multiplier plate is achieved. In order to keep the number of wires and hence the number of simultaneously incident measurement signals in a recording device series-connected to the ion identification device moderate, it might be expedient to arrange the wires at a greater distance or spacing. Then the spectrum of the ion current signals is covered by varying the accelerating potential of the mass spectroscopic device in successive steps. In order to keep the statistical error of the measurement small and to cover the given range of intensity of the ion current signals with sufficient accuracy, it is expedient to repeat the procedure several times.

A change in the accelerating potential results in a change of the deflection radii for the ion trajectories in the magnetic field of the mass spectroscopic device. This is evident from the relation which holds for the deflection radii $$r_m = 144 \cdot \frac{1}{B} \cdot \sqrt{\frac{m \cdot U}{n}}$$

where $B$ = magnetic induction (G)
$m$ = mass number of ions
$U$ = accelerating potential (V)
$n$ = charge condition of the ions
$r$ = deflection radius of the ion trajectories in the magnetic field.

If the accelerating potential is varied and all other magnitudes are kept constant, we obtain for a change of the deflection radius $$dr_m = \tfrac{1}{2} \cdot \frac{dU}{U} \cdot r_m$$

Therefore, it has been found advantageous that the spacings between the wires located behind the channel multiplier plate correspond to the relation $$A_n = \tfrac{1}{2} \cdot f \cdot \frac{\Delta U}{U} \cdot r_n$$

where $A$ are the spacings between the wires
$n$ is the running index for designating the various spacings
$U$ is the accelerating potential of the mass spectroscopic device
$\Delta U$ is an assumed constant rate of change of the accelerating potential $r_n$ is the deflection radius of the ion trajectories due to the change of the accelerating potential $U$, the magnet of the mass spectroscopic device; and
$f$ is a proportionality factor for converting the deflection radius into path lengths in the focal plane The wires are arranged behind the channel multiplier plate with increasing mutual spacing in the following manner: The smallest spacing is located at that point behind the plate where the ions of small mass are incident, and the largest spacing is located at that point behind the plate where the ions of large mass are incident. As a result, all spacings between the collection points determined by the arrangement of the wires are covered by equally large and an equal number of increments of the accelerating potential. Hence it is also possible to traverse the entire mass spectrum with a certain number of potential steps whose sum corresponds to the spacings between two collection points each.

Of course, it is also possible to choose other arrangements for the wires behind the channel multiplier plate. For example, one could choose one where only the signals of ions of certain mass ratios (conditions), e.g., various isotopes, are measurable at constant accelerating potential.

In another very advantageous embodiment of the device in accordance with the present invention, the channel multiplier plate is located behind the discharge or exit gap of the magnet in such a way that the electron multipliers of the channel multiplier plate are aligned perpendicular to the lengthwise direction of the discharge gap and perpendicular to the direction of incidence of the ions in the lengthwise direction of the gap, staggered laterally from the center of the discharge gap. Behind the discharge gap of the magnet there is a device collecting the ions in the focal plane and converting them to electrons in such a way that the electrons are drawn off towards the channel multiplier plate by a potential field located parallel to the direction of the stray magnetic field between the device for converting the ions and the channel multiplier plate. As a result, the channel multiplier plate is protected against direct ion bombardment which also constitutes a material transport, and a premature destruction of the plate is avoided. The channels of the channel multiplier plate are parallel to the stray magnetic field. Therefore, from the conversion device, which is in the form of an electrode, the ions reflected by the electrode do not get to the channel multiplier plate; on the other hand, the electrons reach the plate in a trajectory which runs parallel to the lines of flux of the stray magnetic field of the mass spectroscopic device. This direction of motion of the electrons results in a collimation of the electron beam both in front of and behind the channel multiplier plate. Also, with this direction of motion of the electrons, the process of electron multiplication in the electron multipliers of the plate is barely influenced by the stray magnetic field.

A very advantageous procedure for operating device in accordance with the present invention with a wire arrangement which corresponds to the relation $$A_n = \tfrac{1}{2} \cdot f \cdot \frac{\Delta U}{U} \cdot r_n$$

is as follows: The accelerating potential of the mass spectroscopic device is varied in steps in such a way that, for ions of the same mass, the sum of the spacings, obtained by the stepwise change of the accelerating potential, between the impact points of the ions in the focal plane, which lie in a collecting area in the focal plane, this area being between two adjacent wires, equals the distance between the two wires. As a result of this procedure, the entire mass spectrum is covered without requiring a change in the accelerating potential to such an extent that the ion beam incident at the beginning of the channel multiplier plate, at the start of a measurement, is guided over the entire range of the channel multiplier plate and hence is applied to all wires. It is only necessary to guide the ion beams, assigned at the beginning of the measurement to the collection points corresponding to the wires arranged in accordance with the above relation, by small stepwise variation of the accelerating potential over the range joining the associated wires up to the collection point assigned to the next wire. Hence, with every step another ion beam is applied to the wires and hence to the measurement. At the same time, because of the given arrangement of the wires and because the spacing between the wires corresponds to the same accelerating potential increment for the wire arrangement, all ranges (regions) between the wires are covered by equally large steps and an equal number of steps, and hence the entire mass spectrum is recorded. It may be expedient to vary the accelerating potential by equally large potential increments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a lengthwise section through a mass spectrometer with a channel multiplier plate located behind the exit gap of the magnet; and FIG. 2 is a cross-section through the mass spectrometer taken along line II—II of FIG. 1.

DESCRIPTION OF THE PREFERRED EMBODIMENTS

Referring to the drawings, the ions emitted by a sample are deflected in the electrical field of a spherical condenser 2 and in the field of a magnet 3. They are focused in the focal plane 4 behind the discharge or exit gap or magnet 3. Behind the discharge or exit gap of magnet 3, in order to capture the focused ions, there is a channel multiplier plate 5 behind which the wires 6 insulated from each other, are located. These are arranged along the channel multiplier plate and perpendicular to the direction of the electron multipliers and perpendicular to the lenghtwise direction of the discharge gap where the wires are increasingly spaced apart (not shown in the drawing).

As shown in the drawing, the channel multiplier plate 5 is located behind the discharge or exit gap of the magnet in such a way that the electron multipliers of the channel multiplier tube are aligned perpendicular to the lengthwise direction of the discharge gap and perpendicular to the direction of incidence of the ions in the lengthwise direction of the gap. In the focal plane, a device is provided in the form of electrode 7, which captures the ions whose direction of incidence is denoted by an arrow $I^+$, and coverts them into electrons. The part acting as capturing means of electrode 7 — as shown in FIG. 2 — is inclined by angle between 10° and 45° with the focal plane. As a result of the potential applied between the electrode 7 and the channel multiplier plate 5, the electrons are drawn in the direction of the channel multiplier plate 5 parallel to the stray magnetic field. With the device shown in the drawing, the potential applied to electrode 7 is — 3.5 KV and at the channel multiplier plate side facing the electrode the potential is −3.0 KV. The wires 6 located behind the channel multiplier plate 5 have the potential 0 Volts are connected to threshold value amplifiers 8.

As channel multiplier plate for a mass spectrometer with spark ion source, a plate of about 300 mm length, popularly known as "chevron plate" was used; its channels have a diameter of 30 μm. The plate comprises two channel plates arranged behind each other and staggered at a certain angle in order to reduce the ion feedback. With such a plate, secondary electron gains of $10^6$ to $10^8$ are attained. The sensitive surface of the channel multiplier plate is 60%.

The spacing between the wires behind the channel multiplier plate 5 were dimensioned in accordance with the relation $$A = \tfrac{1}{2} \cdot f \cdot \frac{\Delta U}{U} \cdot r_n.$$

With the mass spectrometer used, the smallest deflection radius for the ions was $r_o = 40$ mm and the proportionality factor was $f = 1.5$. With a maximum deflection radius $r_m$ = 240 mm, an assumed constant rate of change of the accelerating potential (ΔU/U of 6%, the entire evaluation range of the channel multiplier plate was covered with 60 wires. The smallest spacing was $A_1$ = 1.8 mm; the maximum spacing was $A_{60}$ = 10.8 mm. The amplifiers, series-connected to the 60 wires, comprised three stages of a digital logic module known in the art by the designation ECL gate (ECL: emitter-coupled logic). To amplify the current pulse signals knocked off by the secondary electrons in the wires, it was operated in the analog range. In the first stage, which had a sensitivity in the millivolt range, after exceeding a set threshold value, the signals were brought to a digital level and transmitted as digital ECL signal to 16-bit binary counters. These were on-line connected to a computer which had a core storage capacity of 16 K words of 16 bits each, a cycle time of 1.8 μsec and a mass storage with 1700 K words. The transfer of signal information from the counters to the computer took place every 10 msec.

The computer-connected device for detecting electrons in accordance with the present invention was used for measurements with a mass spectrometer with a spark ion source. The frequency of the vacuum arc was 100 Hz. Hence an ion beam was generated every 10 milliseconds, but was extracted only for 130 microseconds.

The accelerating potential was generated by means of a digital-analog converter; the potential stages, in order to cover the entire mass spectrum, were set to a value which made it possible to cover the spcae between the wires acting as collector points in 360 scan steps. The time sequence of the stepwise change of the accelerating potential corresponded to the frequency of the vacuum arc, so that the entire spectrum was traversed (covered) in 360 acquisitions with 60 simultaneously obtained measured values in 3.6 sec. The number of information items per spectrum acquired by the computer storage was 360 × 60 = 21,600. The acquisition of the spectrum was repeated several times, and the measured values acquired from the 60 channels were added to the values of the associated channel already stored in the core storage of the computer.

Since not only the spacings between the acquisition points but also the line widths and hence the density of the ion beams along the discharge or exit gap vary in accordance with the formula $$A_n = ½ \cdot f \cdot \frac{\Delta U}{U} \cdot r_n,$$

and the 60 wires all have the same diameter, a correction of the measured values was provided in the evaluation program of the computer.

In the following, the detection sensitivity of the embodiment in accordance with the present invention is compared with the detection sensitivity of a photo plate:

In order to produce on a photo plate a just barely visible evaluable line on an area of $1.5 \times 0.05$ mm$^2$, one requires approximately $5 \times 10^3$ to $10^4$ ions of medium particle mass with an energy of 20 keV (cf. "Spurenanalyse in hochschmelzenden Metallen" (Trace Analysis of High-Melting Metals), Autorenkollektiu, VEB-Verlag, 1970, p. 57). This corresponds to a lower direction limit for the photo plate of $10^5$ ions per square millimeter.

If a total of $10^5$ ions/mm$^2$ strike the channel multiplier plate in accordance with the embodiment of the present invention, with a wire diameter of 30 $\mu$m, a line height of 1 mm and a sensitive area of the channel multiplier plate of 60%, a total of $0.60 \times 0.03 \times 1$ mm $\times 10^5$ ions/mm$^2$ = 1800 ions will be counted. This means that per potential step of the accelerating potential 1800/360 = 5 ions will be counted. Since the dark pulse rate of the channel multiplier plate used is at 1 to 10 pulses per second and per cm$^2$, the detection sensitivity of the above described device and hence its accuracy is higher than that of a photo plate.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. An arrangement for electrical detection of ions for mass spectroscopic determination of the mass values and of the mass intensities of ions, comprising in combination, a channel multiplier plate having a number of electron multipliers of minimum dimension; mass spectroscopic means with magnet means and exit gap means, said channel multiplier plate being located behind said exit gap means of said magnet means for receiving ions focused in the focal plane of said mass spectroscopic means; means for receiving electrons emanating from said channel multiplier plate and emitted off by ions of different mass in said electron multipliers of said channel multiplier plate; recording means connected to said means for receiving electrons emanating from said channel multiplier plate, said receiving means transmitting signals generated by the received electrons to said recording means; said means for receiving the electrons and transmitting the signals generated by the electrons comprising wires located behind and along the channel multiplier plate and perpendicular to the direction of the electron multipliers and perpendicular to the lengthwise direction of said exit gap means, said wires being isolated from each other and free from contact with each other, said wires having surfaces facing the channel multiplier plate and comprising receiving surface for the electrons; and amplifier means connected to each wire for amplifying the current pulses generated in the wires by the electrons.

2. The arrangement as defined in claim 1 wherein the spacings between said wires located behind said channel multiplier plate are defined further by the relation $$A_n = ½ \cdot f \cdot \frac{\Delta U}{U} \cdot r_n$$

where $A_n$ are the distances between the wires $n$ is a running index for designating various spacings $U$ is the accelerating potential of said mass spectroscopic means $\Delta U$ is an assumed constant rate of change of the accelerating potential $r_n$ is the deflection radius of the ion trajectories, changed due to the change of accelerating potential U, in the magnet of said mass spectroscopic means; and $f$ is a proportionality factor for converting the deflection radius changed into path lengths in the focal plane.

3. The arrangement as defined in claim 1 wherein said electron multipliers of said channel multiplier plate are aligned perpendicular to the lengthwise direction of said exit gap means and perpendicular to the direction of incidence of the ions in the lengthwise direction of the gap, said electron multipliers being displaced laterally from the center of said exit gap means, means for collecting ions in the focal plane and converting them to electrons behind said exit gap means, said means for collecting ions having a stray magnetic field, and an electrical potential field located parallel to the direction of said stray magnetic field between said means for converting ions and said channel multiplier plate, said electrical potential field drawing off the electrons towards said channel multiplier plate.

4. The arrangement as defined in claim 2 wherein the accelerating potential of said mass spectroscopic means is varied in steps in such a way that for ions of the same mass the distance between two wires being equal to the sum of the spacings obtained by the stepwise change of the accelerating potential between the impact points of the ions in the focal plane, said impact points lying in a collecting area in the focal plane, said area being between two adjacent wires.

5. The arrangement as defined in claim 2 wherein said electron multipliers of said channel multiplier plate are aligned perpendicular to the lengthwise direction of said exit gap means and perpendicular to the direction of incidence of the ions in the lengthwise direction of the gap, said electron multipliers being displaced laterally from the center of said exit gap means, means for collecting ions in the focal plane and converting them to electrons behind said exit gap means, said means for collecting ions having a stray magnetic field, and an electrical potential field located parallel to the direction of said stray magnetic field between said means for converting ions and said channel multiplier plate, said electrical potential field drawing off the electrons towards said channel multiplier plate.

6. The arrangement as defined in claim 3 wherein the accelerating potential of said mass spectroscopic means is varied in steps in such a way that for ions of the same mass the distance between two wires being equal to the sum of the spacings obtained by the stepwise change of the accelerating potential between the impact points of the ions in the focal plane, said impact points lying in a collecting area in the focal plane, said area being between two adjacent wires.

7. The arrangement as defined in claim 5 wherein the accelerating potential of said mass spectroscopic means is varied in steps in such a way that for ions of the same mass the distance between two wires being equal to the sum of the spacings obtained by the stepwise change of the accelerating potential between the impact points of the ions in the focal plane, said impact points lying in a collecting area in the focal plane, said area being between two adjacent wires.

* * * * *